United States Patent [19]

Ito et al.

[11] Patent Number: 4,600,999
[45] Date of Patent: Jul. 15, 1986

[54] AUTOMATIC RUNNING WORK VEHICLE

[75] Inventors: Katsumi Ito, Osaka; Jituo Ysohida, Izumi, both of Japan

[73] Assignee: Kubota, Ltd., Osaka, Japan

[21] Appl. No.: 496,565

[22] Filed: May 20, 1983

[30] Foreign Application Priority Data

Jul. 13, 1982 [JP] Japan .................. 57-121564

[51] Int. Cl.⁴ .................. G05D 1/02; G06F 15/50
[52] U.S. Cl. .................. 364/513; 364/424; 318/587; 318/568
[58] Field of Search .............. 364/424, 460, 450, 443, 364/513, 436; 318/587, 568, 575, 578, 579, 580; 180/167–169; 901/1

[56] References Cited

U.S. PATENT DOCUMENTS 3,612,206  7/1969  Ohntrup .................. 318/587
3,715,572  2/1973  Bennett .................. 318/587
4,119,900 10/1978  Kremnitz .................. 318/587
4,402,050  8/1983  Tagami et al. .................. 364/450
4,403,291  9/1983  Von Tomkewitsch .......... 364/424

OTHER PUBLICATIONS

Stauffer, "Heath's New Training Robot Interacts with Environment", Dec. 82, pp. 37–38, Robotics Today.

Primary Examiner—Felix D. Gruber
Assistant Examiner—Thomas G. Black
Attorney, Agent, or Firm—Cushman, Darby & Cushman

[57] ABSTRACT

An automatic running work vehicle having a device for teaching the outer periphery of the entire area of a work site and automatically producing from the result a running course covering the interior thereof. The vehicle is adapted to automatically run the course under steering control.

14 Claims, 11 Drawing Figures

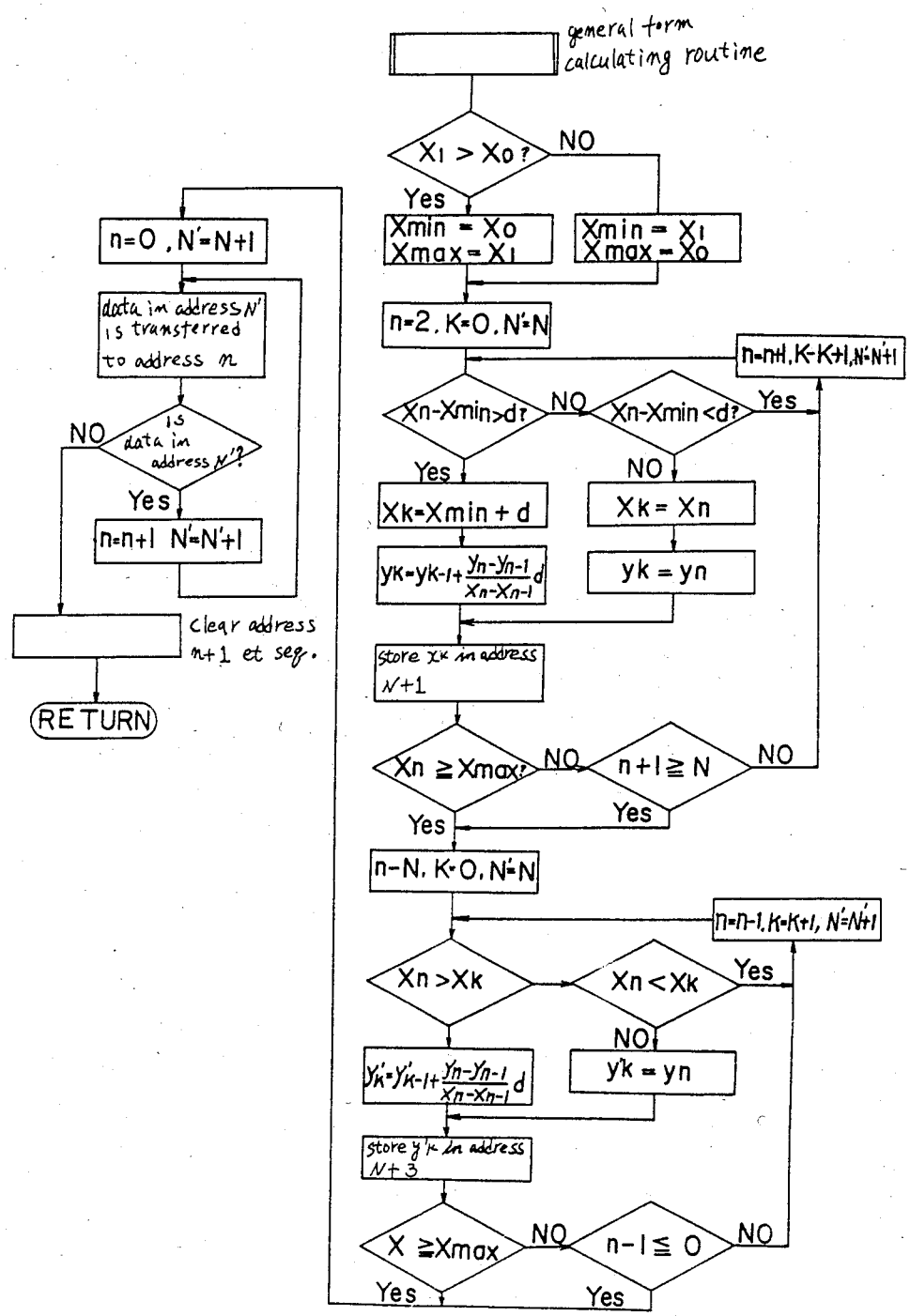

AUTOMATIC RUNNING WORK VEHICLE

BACKGROUND OF THE INVENTION

1. Field of the Invention

The present invention relates to a bulldozer, sprinkling truck, mower or like work vehicle which performs work on the site of its passage while running and which is adapted to automatically run at least part of its course without any riding driver while performing tasks.

2. Description of the Prior Art

Such automatic running work vehicles heretofore known include those for which a teaching playback control system is used. With this conventional system, the operator preliminarily manually drives the work vehicle on the entire course to be automatically run to sample the running course as to the running distance, directions, etc. and store the sampling information in a memory. For the subsequent work, the vehicle is automatically driven along the specified running course in unmanned state according to the sampling information thus taught as to the running course. Thus the system involves the necessity of manually driving the work vehicle over the entire running course at least once and is totally useless for work which needs to be performed only once. The system has another drawback in that the memory must store a very large amount of sampling information as to the running course.

SUMMARY OF THE INVENTION

An object of the present invention, which has been accomplished in view of the above situation, is to provide an automatic running work vehicle which is fully adapted for teaching playback control with use of a compact device of small memory capacity.

To fulfill the above object, the automatic running work vehicle of the present invention is characterized in that the work vehicle has means for teaching the outer periphery of the entire area of a work site and thereby automatically producing a running course covering the interior thereof, and means for causing the work vehicle to run the running course under steering control.

The above feature eliminates the need to store information as to the entire running course and therefore achieves a great saving in the amount of use of the memory required for teaching playback control. Accordingly the work vehicle is fully adapted for teaching playback control for universal use although incorporating a device of minimized size.

Other objects and advantages of the present invention will become apparent from the following description.

BRIEF DESCRIPTION OF THE DRAWINGS

FIGS. 6 (B) to (F) are flow charts showing subroutines.

DESCRIPTION OF THE PREFERRED EMBODIMENT

Figure 1:
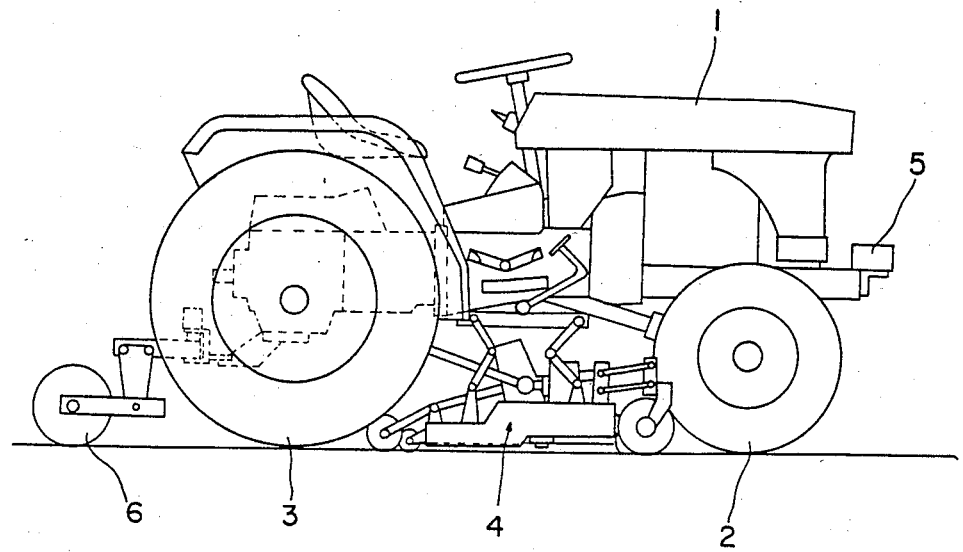
FIG. 1 is an overall side elevational view showing an automatic mower as an automatic running work vehicle embodying the present invention.

With reference to FIG. 1, a vehicle body 1 has a mower assembly 4 vertically movably suspended therefrom and positioned between the front and rear wheels 2 and 3. The vehicle body 1 further has an orientation sensor 5 on a front portion thereof for sensing the geomagnetism and thereby detecting the running direction of the body 1, and a fifth wheel connected to its rear end and serving as a distance sensor 6 for continuously detecting the distance of travel of the vehicle body 1. The mower vehicle serves as a work vehicle which is adapted to run automatically without a riding driver.

Figure 2:
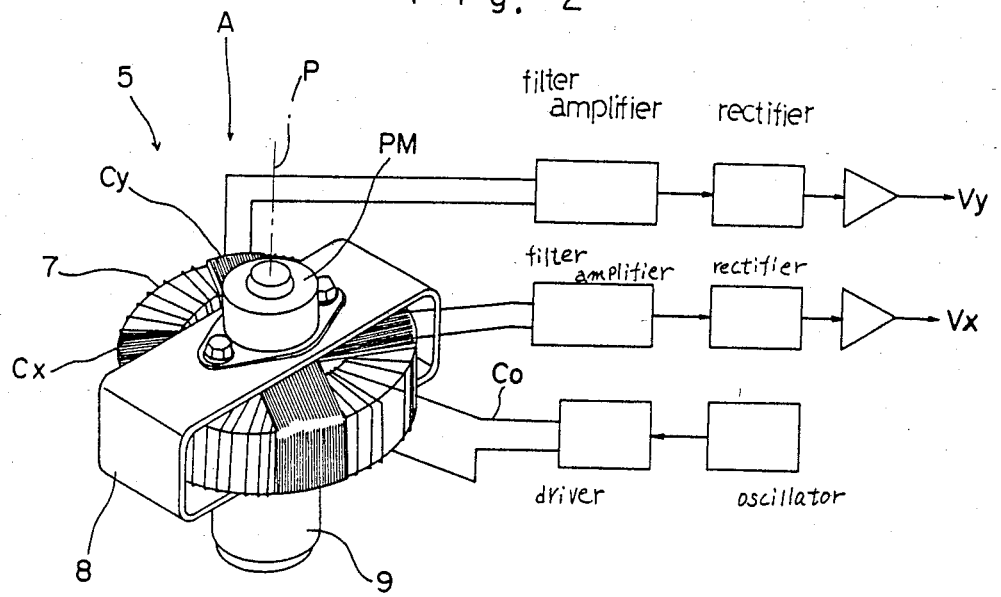
FIG. 2 is a diagram showing the structure of an orientation sensor.

As seen in FIG. 2, the orientation sensor 5 comprises a toroidal core 7 having an exciting coil Co wound thereon, and output coils Cx, Cy diametrically wound on the coil Co and intersecting each other at right angles. When the toroidal core 7 is subjected to an external magnetic field (geomagnetism) with a.c. current passing through the exciting coil Co, the output coils Cx, Cy generate a.c. signal voltages in proportion to the external magnetic field. The a.c. signal voltages generated in the output coils Cx, Cy are amplified to a predetermined level and then converted to d.c. voltages Vx, Vy, the ratio of which indicates an orientation.

The toroidal core 7 constituting the orientation sensor 5 is provided with rotating means A rotatable through 360° about a vertical axis P for correcting the difference in the magnetic sensitivity of the output coils Cx, Cy in different orientations and enabling these coils to detect the running direction of the vehicle body 1 relative to a specified orientation.

The rotating means A comprises a nonmagnetic bracket 8 having the toroidal core 7 fixed thereto, and a motor 9 for rotating the bracket 8 clockwise or counterclockwise. A potentiometer PM is provided on the axis P for detecting the angle $\theta$ of rotation of the sensor.

The distance sensor 6 generates a pulse per unit distance of travel of the vehicle body 1. A counter 10 counts up a specified number of pulses to detect a predetermined distance of travel, $l_0$.

Next, a control device 11 will be described which serves as a general form teaching device for calculating the general form of a work site from sampling information. The information is obtained by sampling a running course around the work site based on the detection signals from the orientation sensor 5 and the distance sensor 6 of the foregoing construction.

Figure 3:
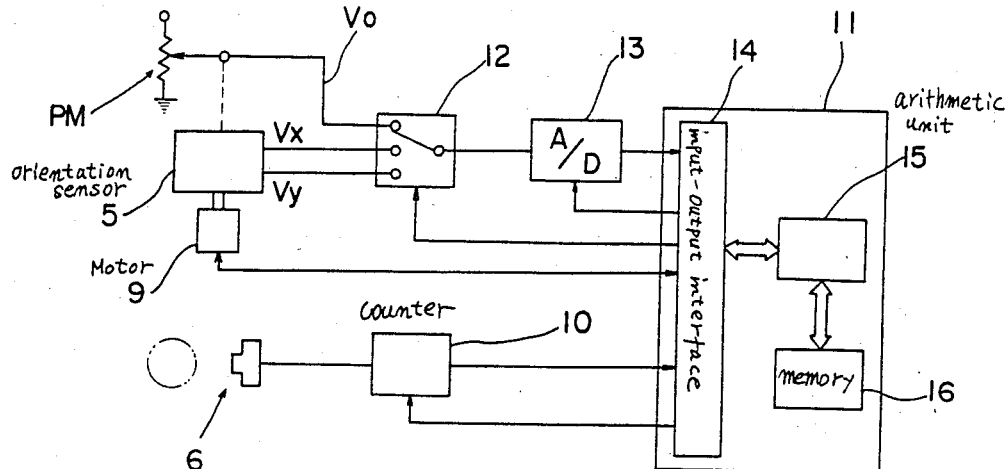
FIG. 3 is a block diagram showing a control system.

With reference to FIG. 3, the d.c. voltages Vx, Vy delivered from the orientation sensor 5 and serving as orientation detecting signals and the voltage V0 given by the potentiometer PM and representing the angle of rotation of the sensor 5 are fed through a signal selector 12 to an A/D converter 13, in which the voltages are converted to digital signals. The signals are fed to an arithmetic unit 15 of the control device 11 via an input-output interface 14. Every time the specified number of pulses (corresponding to the predetermined travel distance $l_0$) from the distance sensor 6 have been counted up by the counter 10, the voltages Vx, Vy as the orientation data detected by the orientation sensor 5 are sampled and stored in a predetermined address area of a memory 16. To correct, with respect to every orientation, the sensitivity with which the geomagnetism is detected by the orientation sensor 5, prior to the orientation sampling to be conducted every predetermined travel distance $l_0$ and also to sample detected absolute orientations in terms of changes in the running direction of the vehicle body 1 relative to the specified direction of the work site, average detection voltages $\overline{X}$, $\overline{Y}$ with respect to a reference orientation are calculated prior to the teaching of the outer periphery of the work site, by rotating the orientation sensor 5 through 360° with the vehicle body 1 at a halt and sampling the detection voltages Vx, Vy every specified angle $\theta_p$.

Figure 4:
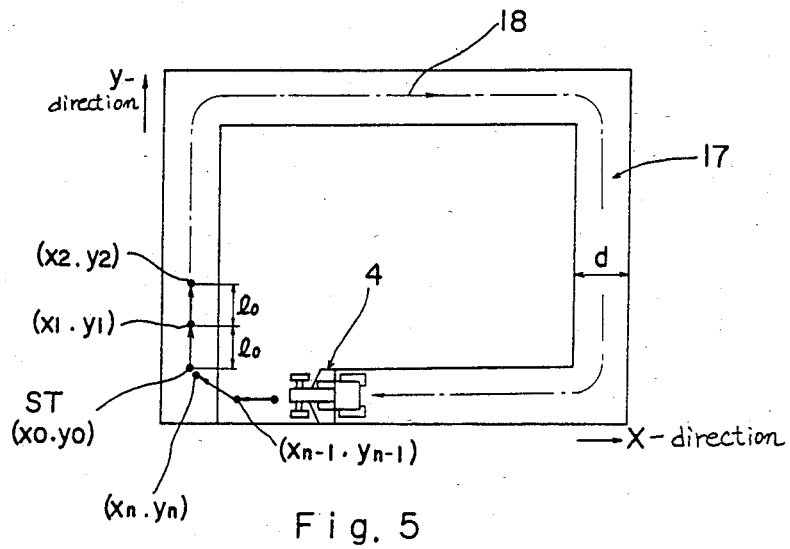
FIG. 4 is a diagram illustrating the concept of teaching.
Figure 5:
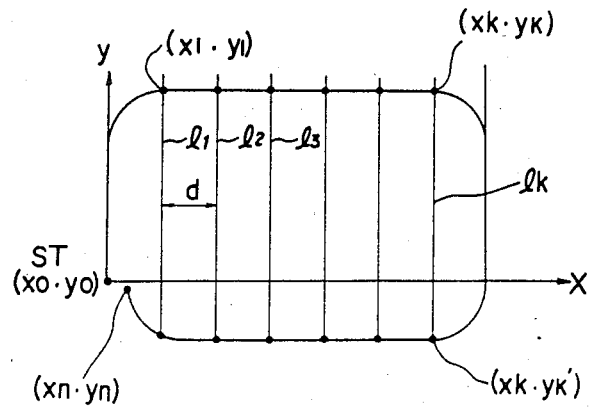
FIG. 5 is a diagram illustrating the concept of conversion of coordinates.

With reference to the diagram of FIG. 4 showing the concept of teaching, the system will now be described for obtaining the general form of the work site by running orientation sampling for the teaching of the work site outer periphery and by calculating the coordinates of the sampling points of the running course from the sampling information.

The operator rides on the work vehicle and runs the vehicle along the outer periphery 18 of the work site 17 one or several turns to form a mowed outer peripheral area having the same width as or several times the cutting width d of the mower assembly 4. During the running, the detection voltages Vx, Vy from the orientation sensor 5 are sampled every predetermined travel distance $l_0$ from the start point ST to obtain orientation data Xn, Yn as converted to displacement values relative to the reference orientation voltages $\overline{X}$, $\overline{Y}$, and the data is stored in a predetermined address area of the memory 16.

After the teaching of the work site outer periphery 18, the vehicle body 1 is stopped temporarily at the start point ST or in the vicinity thereof, and the coordinates xn, yn of the sampling points of the outer periphery 18 with respect to the start point ST are calculated by the following procedure.

Stated more specifically, the items of orientation data Xn, Yn are compared with the reference orientation voltages $\overline{X}$, $\overline{Y}$ respectively to judge the quadrant of the running direction and calculate the orientation $\theta$ of the running direction with respect to the reference orientation. The coordinates xn, yn of each of the sampling points are calculated from the orientation $\theta$, the predetermined travel distance $l_0$ and the coordinates xn−1, yn−1 of the preceding sampling point and are stored in the same address area of the memory 16 as the orientation data Xn, Yn, whereby the orientation data Xn, Yn obtained for the outer peripheral teaching is replaced by the coordinate data xn, yn of the work site outer periphery. The coordinates x0, y0 of the start point ST are preset as coordinates 0,0, and the coordinates xn, yn of the other sampling points are calculated in terms of relative distances from the reference coordinates 0, 0 in the x-direction and y-direction.

The sampling information of the teaching converted to the coordinate system with respect to the start point ST by the above procedure is further converted by the following procedure to a coordinate system corresponding to the cutting width d of the mowing assembly 4.

The maximum and minimum x-coordinates xmax and xmin of the coordinates xn, yn of the sampling points are calculated. Based on the minimum x-coordinate xmin, the y-coordinates yk, y'k at each x-coordinate xk at a distance of the cutting width(s) d from the minimum xmin are calculated by interpolation, and the resulting data is totally substituted for the data in the address area of the memory 16 in which the sampling point coordinates xn, yn are stored. Thus the general form of the work site is calculated and stored in terms of the coordinates xk, yk, y'k which are directly usable for mowing.

The data of coordinates xk, yk, y'k thus calculated can be stored in a smaller memory area than the sampling information stored for the outer periphery teaching, so that the amount of the memory eventually used can be smaller.

Based on the coordinates xk, yk, y'k corresponding to every cutting width d, the distance $l_1$ to $l_k$ the vehicle is to be run for each straight section of the running course is calculated from the coordinates yk, y'k. Thus it is easy to calculate the information as the running course which is required, for example, for automatic steering in the mowing operation to be conducted after the teaching of the general form.

Instead of storing the foregoing coordinates xk, yk, y'k as the final information, the expected running distance $l_1$ to $l_k$ for each straight section may be stored as the final information, i.e., the information as to the general form of the work site. This serves to further reduce the amount of use of the memory.

Although the orientation sensor 5 of the above embodiment is adapted to indicate the running direction by detecting the geomagnetism, alternatively usable for detecting the running direction during teaching is means for detecting the steering angle of the front wheel 2 or the angular deflection of the fifth wheel serving as the distance sensor 6.

Figure 6:
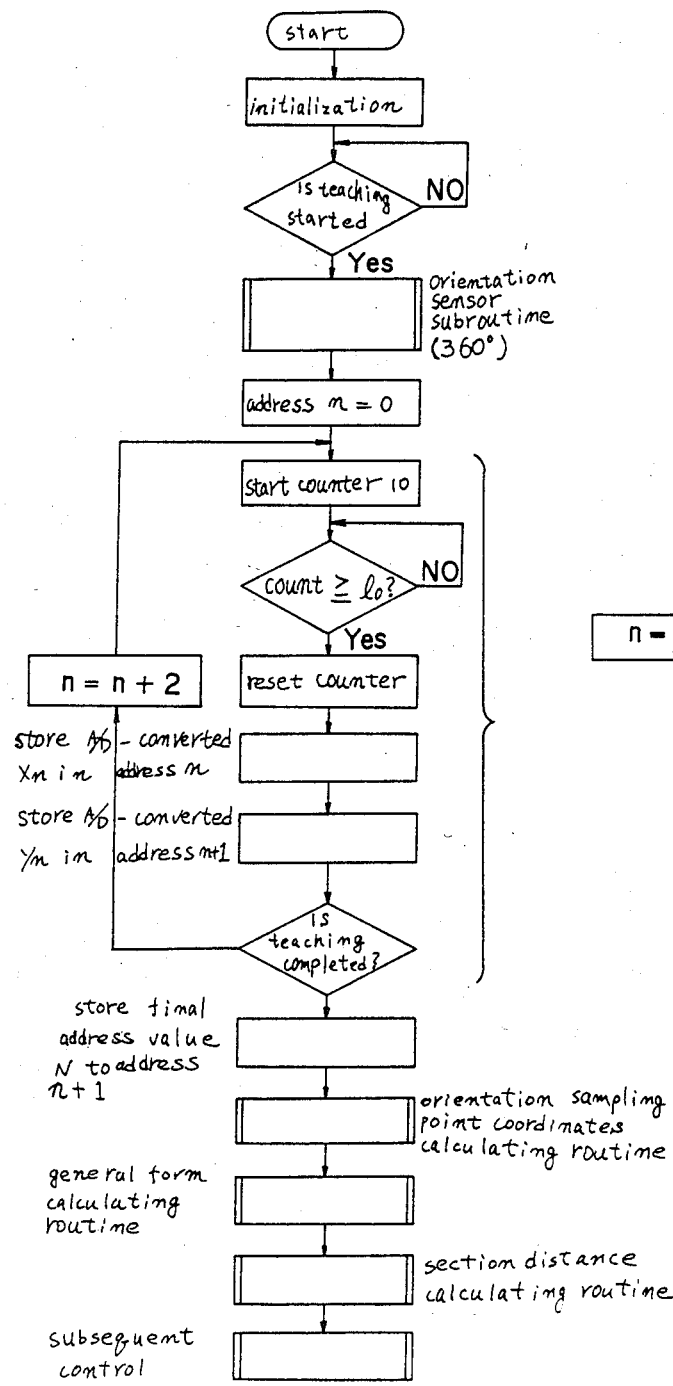
FIG. 6 (A) is a flow chart showing the overall operation of the control system.
Figure 6:
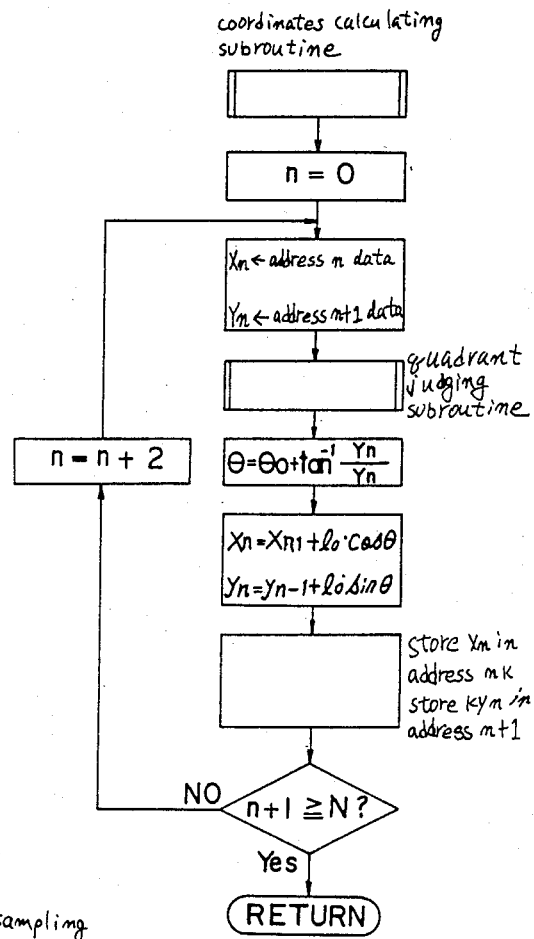
Figure 6:
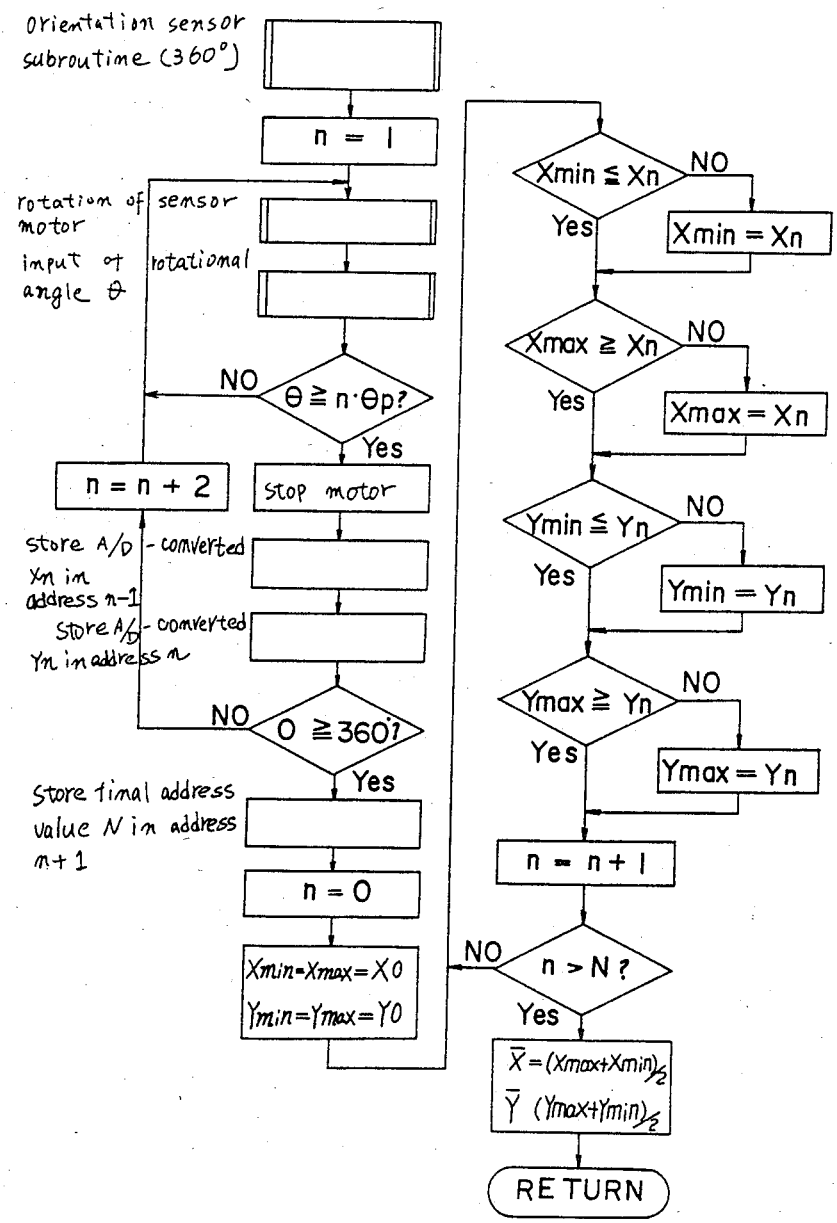
Figure 6D:
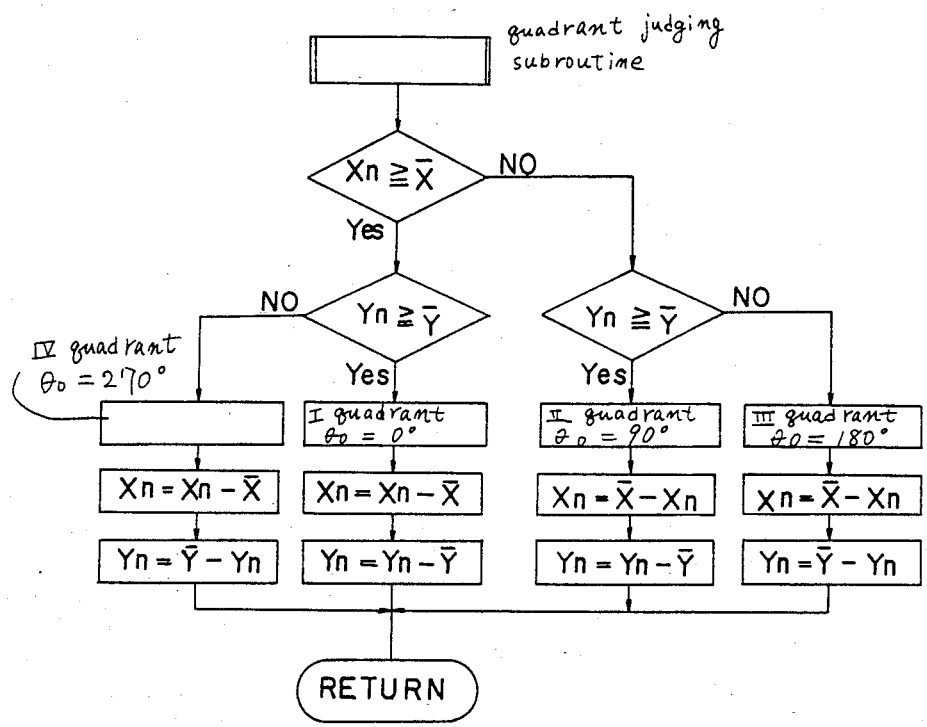
Figure 6F:
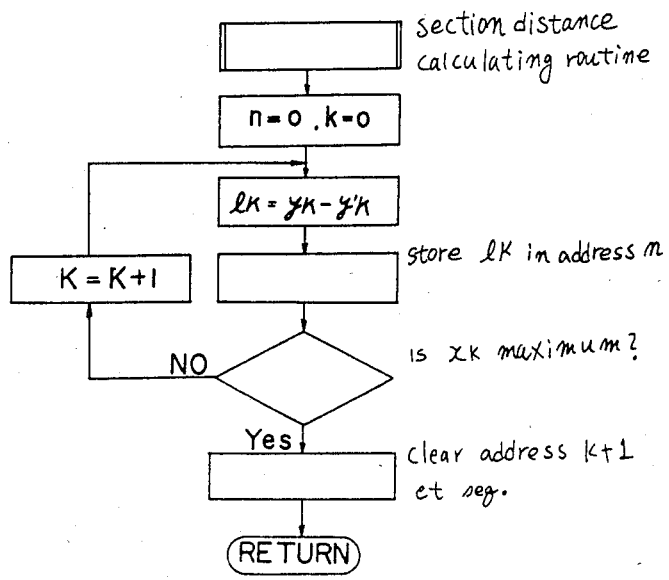

The steps i shown in the flow chart of FIG. 6 (A) and included in the orientation sampling following the counting of pulses from the distance sensor 6 may be provided as a routine which is initiated upon an interrupt in response to an output from the counter 10 so as to be included also in other control routine for the work to be performed after the calculation of the general form of the work site.

We claim:

1. A controller for controlling a work vehicle to automatically travel along a zig-zag path covering a work area, comprising:
   orientation sensing means for producing directional signals indicating the direction of travel of a work vehicle;
   distance measuring means for producing distance signals indicating the distance travelled by said vehicle;
   area outer periphery learning means, connected to receive said directional and distance signals, for calculating data indicating the position of the outer periphery of a work area in response to the distance and directional signals produced while the vehicle is manually controlled to travel a peripheral path along the outer periphery of the work area by a human operator, said learning means calculating position-indicating data each time said vehicle travels a predetermined distance along said outer peripheral path;
   automatic path determining means for producing, in response to the data calculated by said learning means, running data indicating a zig-zag path covering the entire portion of said work area within said peripheral path, said zig-zag path including a sequence of respective path segments; and
   running control means for automatically controlling said vehicle to travel along said zig-zag path in response to said running data, said running control means controlling said vehicle to turn from a present path segment over which said vehicle is travelling onto the next path segment in said sequence when said distance signal indicates the vehicle has completely traversed the present path segment.

2. A method for automatically traversing a work area with a work vehicle comprising the steps of:
   (1) sensing the instantaneous orientation of a work vehicle and the distance traveled by the vehicle;
   (2) manually controlling the work vehicle to travel along a peripheral path delimiting the boundary of a work area;
   (3) producing, at plural distance intervals along said peripheral path, indicia of the position of said work vehicle in response to said orientation and distance sensed by said sensing step (1);
   (4) deriving, from said data produced by said producing step (3), indicia of a sequence of respective segments of an interior path covering substantially the entire portion of said work area within said peripheral path; and
   (5) automatically controlling said work vehicle to travel along said segments of said interior path in sequence and for controlling said vehicle to turn from segment to segment in response to the distance sensed by said sensing step (1).

3. A method as in claim 2 wherein:
said controlling step (2) comprises the step of controlling said vehicle to travel a peripheral closed path along the periphery of said work area; and
said indicia deriving step (4) includes the steps of:
   (a) producing indicia of a first interior closed path within said peripheral closed path, and
   (b) subsequent to said producing step (a), producing indicia of another interior closed path within the closed path indicia of which was previously calculated by said producing step (a).

4. A method as in claim 3 wherein said deriving step (4) further includes the step (c) of, subsequent to said producing step (b), producing indicia of a further interior closed path within the closed path indicia of which have previously been calculated by said producing step (b).

5. A method as in claim 3 wherein said indicia-producing step (b) produces said indicia of another interior closed path only after said vehicle has been controlled by said controlling step (5) to travel the entirety of said path the indicia of which was previously calculated by said producing step (a).

6. A method as in claim 2 wherein said deriving step (4) includes the step of progressively deriving indicia of new segments of said interior path not yet travelled along by said vehicle and contiguous to segments of said path said controlling step (5) has already controlled said vehicle to travel.

7. A method as in claim 6 wherein said progressively deriving step includes the step of calculating indicia of new segments of said path from inidica of segments of said path already travelled by said vehicle.

8. A method as in claim 7 wherein said method further includes the steps of:
subsequent to said producing step (3), storing said indicia of said outer peripheral path produced by said producing step (3); and
rewriting said indicia stored by said storing step with said indicia calculated by said progressively deriving step.

9. An apparatus for automatically controlling a work vehicle to traverse a work area comprising:
means for sensing the instantaneous orientation of a work vehicle and the distance travelled by the vehicle; and
processing means for:
   (1) producing, at plural distance intervals along a peripheral path delimiting the boundary of a work area while said vehicle is manually controlled to travel along said peripheral path, indicia of the position of said peripheral path in response to said orientation and distance sensed by said sensing means,
   (2) deriving, from said peripheral path position indicia, indicia of a sequence of respective segments of an interior path covering the entire portion of said work area within said peripheral path, and
   (3) automatically controlling said work vehicle to travel along said segments of said interior path in sequence and for controlling said vehicle to turn from segment to segment in response to the distance sensed by said sensing means.

10. An apparatus as in claim 9 wherein said processing means produces indicia of a closed peripheral path when said work vehicle is manually controlled to travel a closed path along the boundary of said work area, and produces indicia of a first interior closed path within said peripheral closed path and subsequently also produces indicia of a subsequent interior closed path within the first interior closed path.

11. An apparatus as in claim 10 wherein said processing means produces said indicia of said subsequent closed path only after said processing means control said vehicle to travel the entirety of said first interior closed path.

12. An apparatus as in claim 9 wherein said processing means progressively derives indicia of new segments of said interior path not yet travelled by said vehicle which are contiguous to segments of said path said processing means has already controlled said vehicle to travel.

13. An apparatus as in claim 12 wherein said processing means calculates indicia of said new segments of said path from indicia of segments of said path already travelled by said vehicle.

14. An apparatus as in claim 13 further including means for storing said peripheral path position indicia and for rewriting the indicia stored in said storing means with the indicia of said new segments.

* * * * *